United States Patent
Armstrong et al.

(10) Patent No.: US 7,409,719 B2
(45) Date of Patent: Aug. 5, 2008

(54) COMPUTER SECURITY MANAGEMENT, SUCH AS IN A VIRTUAL MACHINE OR HARDENED OPERATING SYSTEM

(75) Inventors: Benjamin Armstrong, Redmond, WA (US); Paul England, Bellevue, WA (US); Scott A. Field, Redmond, WA (US); Jason Garms, Woodinville, WA (US); Michael Kramer, Redmond, WA (US); Kenneth D. Ray, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 522 days.

(21) Appl. No.: 11/019,094

(22) Filed: Dec. 21, 2004

(65) Prior Publication Data

US 2006/0136720 A1    Jun. 22, 2006

(51) Int. Cl.
    *G06F 21/00* (2006.01)
(52) U.S. Cl. .............................. 726/24; 713/1; 713/187; 713/188
(58) Field of Classification Search ............... 726/24; 713/1, 187, 188; 718/1
    See application file for complete search history.

(56) References Cited

U.S. PATENT DOCUMENTS

2006/0021032 A1 * 1/2006 Challener et al. ............. 726/22

OTHER PUBLICATIONS

Karger et al., A VMM Security Kernel for the VAX Architecture, Proceedings of the Computer Society Symposium on Research in Security and Privacy, IEEE Pub. May 1990, pp. 2-19.*

* cited by examiner

*Primary Examiner*—Emmanuel L Moise
*Assistant Examiner*—Paul Callahan
(74) *Attorney, Agent, or Firm*—Woodcock Washburn LLP

(57) ABSTRACT

A security scheme provides security to one or more self-contained operating environment instances executing on a computer. The security scheme may include implementing a set of security applications that may be controlled by a supervisory process, or the like. Both the set of security applications and the supervisory process may operate on a host system of the computer, which may also provide a platform for execution of the one or more self-contained operating environments. The security scheme protects processes running in the one or more self-contained operating environment and processes running on the computer outside of the self-contained operating environments.

19 Claims, 10 Drawing Sheets

COMPUTER SECURITY MANAGEMENT, SUCH AS IN A VIRTUAL MACHINE OR HARDENED OPERATING SYSTEM

TECHNICAL FIELD

The described technology relates generally to maintaining the security and integrity of computer operating systems.

BACKGROUND

When software that has been designed specifically to damage or disrupt a system (e.g., malicious software or "malware") invades a computer system, the integrity of the computer's operating system, and hence the entire computer system, is greatly compromised. While the security concerns and requirements of computer users range widely, given the rise of virus, worm, and Trojan threats, most computer users are concerned with the integrity of their computers' critical infrastructure components such as operating system processes, memory processes, etc.

Some types of malware use the operating system's privileged operations to attack the computer. Such privileged operations typically consist of instructions or sets of instructions that are accessible only by a privileged user or process. For example, when malware is somehow able to access one or more of these privileged operations, this may result in the deletion or corruption of operating system files, the attack of in-memory operating system components, the deletion of user files, and many other harmful possibilities. In some cases, even non-malicious processes may damage a computer system through inadvertent behavior that accesses privileged operations. More generally, almost any process may be able to obtain access to privileged operations by simply assuming the identity of a privileged user.

Normally, operating systems provide an infrastructure for hosting processes and providing system services to those processes. Operating systems typically provide basic security protections—such as enforcing access control and ownership rights over system resources. For example, in normal operating system environments, protective security services such as host firewall, vulnerability assessment, patch detection, behavioral blocking, host or network intrusion detection, and antivirus technologies are all run as native applications in the operating system. Despite these measures, the operating system is sometimes unable to accurately determine whether it has been attacked. Specifically, once a piece of malicious code or other malware attacks a computer system and gains sufficient control (e.g., administrator-level access), all further attempts by the operating system to determine whether it is under attack are no longer trustworthy because the mechanisms for such attempts may also be corrupted. This is because the malicious code could effectively modify any of the in-memory or on-disk structures used by the operating system or the applications used to protect it.

One approach to protecting a computer system and its operating system involves installing a set of security applications such as antivirus software, personal firewalls, and intrusion detection systems. In systems with multiple computer systems, such as a computer network or a cluster of computer systems deployed in an array, each individual computer system runs its own set of security applications. This is because each computer system in the network or array is a physically separate entity with its own network attachment, its own central processing unit(s), its own instance of an operating system, etc. While such security applications may be installed on each computer system to prevent the computer system and its operating system from being compromised, such security applications may too fail to protect the computer system because, just like any of the other applications running on the computer system, they are also vulnerable to attack.

In another approach to protecting a computer system and its operating system, aspects of the computer system, such as the memory, are protected by isolating aspects of the computer system.

SUMMARY

The computer security techniques described herein provide various security features, including the use of a single security process (or set of security processes) to monitor, protect, and repair multiple logically isolated virtual machines running on a host system. In some embodiments, the security techniques provide security to one or more self-contained operating environment instances executing on a computer. The security techniques may include implementing a security application that may be controlled by a supervisory process. The security application may monitor one or more virtual machines. This monitoring may be done using various techniques, including offline scanning of the virtual machines by the security application, implementing an agent security process running on each of the virtual machines, etc.

In some embodiments, both the set of security applications and the supervisory process may operate on a host system of the computer, which may also provide a platform for execution of the one or more self-contained operating environments. The security techniques may protect processes running in the one or more self-contained operating environments and processes running on the computer outside of the self-contained operating environments.

Figure 1:
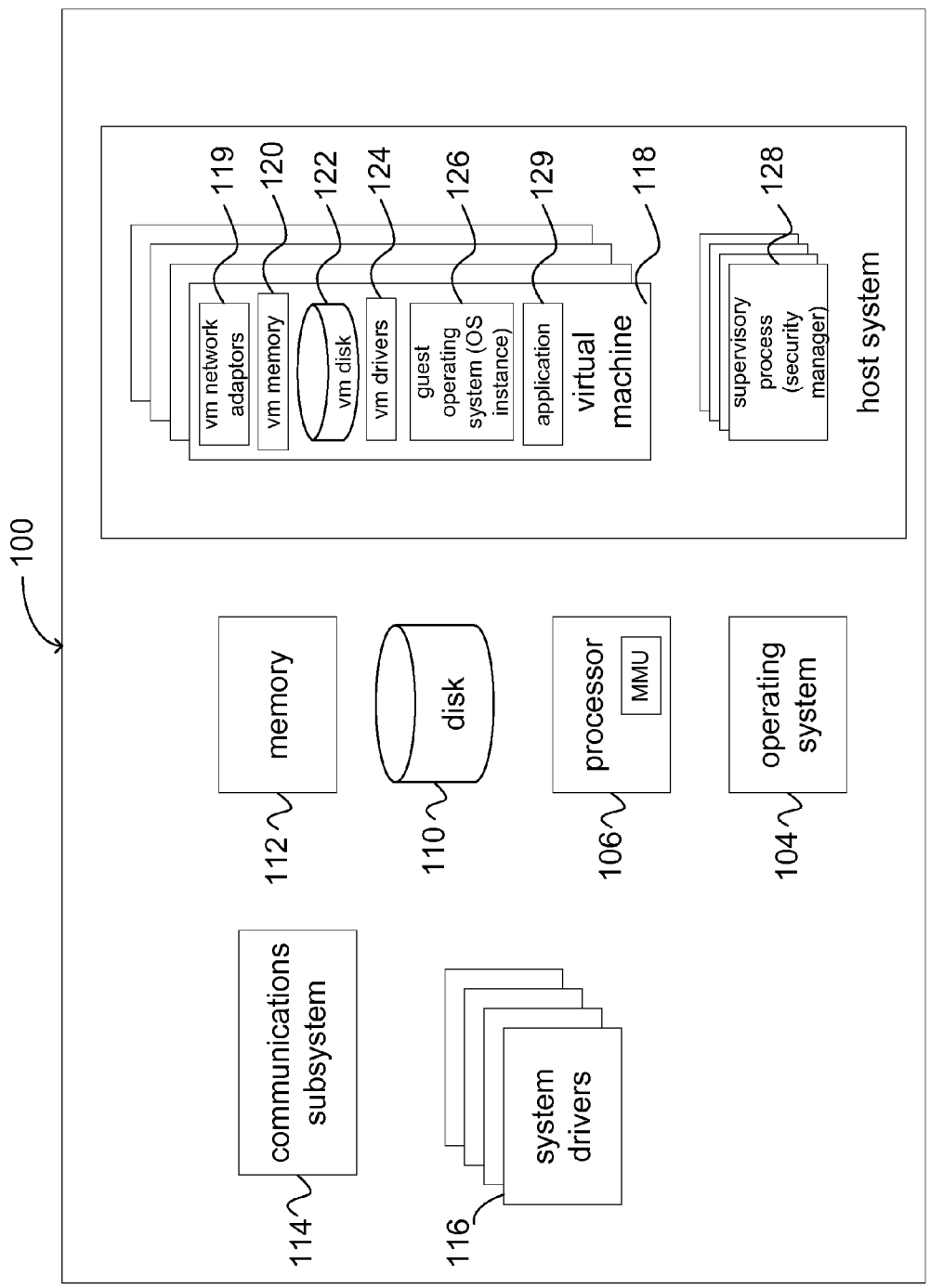
FIG. 1 is a block diagram showing an example of a system for implementing security techniques in one embodiment.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

The computer security techniques described herein provide various security features, including the use of a single security process (or set of security processes) to monitor, protect, and repair multiple logically isolated virtual machines running on a host system.

In some embodiments, a host system, which executes on a physical machine, provides a virtual machine on which an operating system and applications can execute. While many processes may execute on the virtual machine, in general, the operating system and applications executing on the virtual machine cannot access resources (e.g., memory and devices) except as permitted by the host system that provides the virtual machine or as specified by a quest that has been assigned to a virtual machine.

If a virtual machine executes malware, any damage is confined to the operating system, applications, and accessible resources of the virtual machine. In this way, the computer is substantially protected from the effects of malware that executes on the virtual machine.

In some embodiments, the host system may prevent the operating system and applications executing on the virtual machines from performing privileged operations that can cause undesirable changes to the resources or operating system of the physical machine. For example, the operating system executing on the virtual machine may be given administrative privileges within the virtual machine, but not within the physical machine.

In some embodiments, the host system implements proactive security processes. Examples of such security processes include host firewall monitors, vulnerability assessment monitors, patch detection monitors, behavioral blocking monitors, host or network intrusion detection monitors, and antivirus technologies. In general, the security processes are configured to enhance the security of the virtual machines, the host system, and, subsequently, the physical machine.

In some embodiments, the security processes are embodied as or controlled by a supervisory process running on the host system. The supervisory process may facilitate or provide the security processes with some level of access and visibility to components of the virtual machines, including virtual memory, virtual disk, virtual network adaptors, virtual drivers, etc. (e.g., in the form of in-memory data structures or object models). For example, the supervisory process may allow the security process to scan a data structure in memory or stored on disk corresponding to a virtual machine's virtual hard disk for signs of malware or security breaches. In addition (or alternatively), when provided an object model that is supported by the host system, the supervisory process can facilitate returning information about the state of the virtual machine (such as memory state or communication state) to the host system. In general, because the host system and supervisory process provide some level of isolation, the security processes may supervise and monitor the security of the virtual machines, while still remaining inaccessible to harmful programs executing in these virtual machines. In this way, the security processes are protected from tampering or defeat by the programs that they are tasked with monitoring.

In some embodiments, the security processes may be used to monitor and repair a virtual machine that is in a saved state where the execution of the virtual machine monitor has been halted and where all information pertaining to the virtual machine's memory, device and CPU state has been written out to a physical file. The security processes may also be used to monitor and repair a virtual machine that is in a paused state, which is typically invoked by a virtual machine manager. During the paused state, the virtual machine ceases execution, but remains ready to resume a next instruction and processing. In either the paused or saved state scenario the virtual operating system inside of the virtual machine has no knowledge of the state change. Likewise, the security processes may have the ability to scan and repair or clean a virtual machine before it is loaded into the host system.

In some embodiments, the host system can mount a virtual machine's hard disk as if it were a physical disk and then scan the virtual hard disk on a block level (like any other mounted disk). For example, the host system may employ a disk driver that can be loaded into the physical machine's operating system. This disk driver may then interpret the virtual hard disk and present it to the host system as a locally attached disk.

Another approach to monitoring the virtual machines is to run an "agent" security process in each virtual machine. In this approach, the agent security process is associated with a primary security process on the host system. The agent security process opens a communication channel to the primary security process and assists in discovery of and recovery from an attack of the virtual machine. While this scenario may involve a risk of the agent security process being compromised during an attack, the agent may still have an external recovery option available to it via the primary security process. In some scenarios (e.g., scenarios involving the use of a hypervisor), the agent may run in a different virtual machine than the virtual machine it is actually monitoring.

In some embodiments, the host system can take periodic snapshots of the entire state of each virtual machine. Theoretically, this snap-shotting could be performed instantaneously, with minor performance overhead. However, many variations of this technique could be possible. If a security process detects an anomaly within the virtual machine (e.g., malware overwriting the operating system or malware that manifests itself as in-memory program), then the host system can restore the state of the virtual machine to that of the latest snapshot, take action to prevent the recurrence of the anomaly, and restart the virtual machine.

II. Representative System

FIGS. 1-5 and the following discussion provide a brief, general description of a suitable environment in which the invention can be implemented. Although not required, aspects of the invention are described in the general context of computer-executable instructions, such as routines executed by a general-purpose computer (e.g., a server computer, wireless device, or personal/laptop computer). Those skilled in the relevant art will appreciate that the invention can be practiced with other communications, data processing, or computer system configurations, including Internet appliances, hand-held devices (including personal digital assistants (PDAs)), wearable computers, all manner of cellular or mobile phones, embedded computers (including those coupled to vehicles), multi-processor systems, microprocessor-based or programmable consumer electronics, set-top boxes, network PCs, mini-computers, mainframe computers, and the like.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communication network. In a distributed computing environment, program modules may be located in both local and remote memory storage devices.

Aspects of the invention may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer, such as a mobile device.

Referring to FIG. 1, a computer system (physical machine) 100 on which the computer security techniques can be implemented provides various components. These components include a host system 102 configured to run on the computer system 100 in addition to, in combination with, or in place of a standard or general purpose computer operating system 104. In some embodiments, the host system 102 may be configured so that it is inaccessible to everything except native and/or privileged supervisory and security functions. The host system 102 may interface with one or more computer resources, such as a processor 106 with a memory management unit (MMU) 108, a disk 110, a memory 112, a communications subsystem 114, and one or more system drivers 116.

In some embodiments, the one or more virtual machines 118 run under the control of the host system 102 and may be subordinate to the host system 102. The virtual machines 118 may each be comprised of a collection of components that facilitate the virtualization or emulation of a processor and other machine resources. For example, as shown in the illustrated embodiment, each of the virtual machines 118 has access to a set of emulated resources, including virtual network adapters 119, virtual memory 120 (which may consist of an allocated portion of the physical machine's memory 112), virtual disk 122, and one or more virtual drivers 124 that each represent a virtual instance of non-virtual system drivers 116. A virtual operating system instance 126 runs on each of these virtual machines 118. In some embodiments, the virtual operating system instance 126 may be a full or partial copy of the physical machine's operating system 104.

In general, the virtual machines 118 may depend on the MMU 108 to provide various page-level protections. In general, applications or processes 129 running on the each of the virtual machines use only the emulated resources (e.g., virtual memory 120, virtual disk 122, virtual drivers 124, operating system 126, etc.) of their respective virtual machine. Such applications or processes 129 are sometimes referred to as "guest" code. The emulated resources are generally assumed to be trustworthy in the sense that they honor standard protection mechanisms on the host system 102 and do not expose any host system user data to the guest code unless explicitly instructed to do so.

In some embodiments, the emulated resources may exchange data between the host system 102 and the guest code running on the virtual machine 118 using several integration techniques, such as I/O port accesses, memory-mapped registers, direct memory access (DMA), interrupts, etc. Other data exchange techniques include clipboard sharing, file drag and drop, time synchronization, etc. To support such data exchange techniques, the virtual machines 118 may provide several facilities including asynchronous guest events, synchronous host calls, data transfer between the guest code and host system 102, an integration service registry, etc.

The virtual machines 118 may be created or initiated on the host system 102 using any of several possible techniques. For example, in one embodiment, the host system 102 may create and launch an instance of a virtual machine and configure parameters for the virtual machine at creation time. In some embodiments, the host system 102 may locate an existing virtual machine image on disk 110 (perhaps on a share) and load that image as a new virtual machine instance. In some cases, this loading is referred to as "importing" a virtual machine instance and is in some ways analogous to an "import" function that brings in data from one application into another.

In some embodiments, a set of one or more supervisory processes 128 runs on the host system 102. In some embodiments, the one or more supervisory processes 128 may have full or partial access to the virtual operating system instances 126, and can provide a security service to each of the virtual machines 118. In some embodiments, the supervisory processes 128 may also handle activities such as digital rights management (DRM) and licensing control. Because this configuration provides that any malware running on the virtual machines 118 cannot access resources outside each virtual machine, the supervisory process 128 is generally safe from corruption by the malware.

In some embodiments, the one or more supervisory processes 128 control a set of security applications (e.g., antivirus software, personal firewalls, intrusion detection systems, etc.) that may protect and/or supervise all of the virtual machines 118 on the host system 102. For example, the one or more supervisory processes may facilitate offline scanning of multiple virtual machines by the set of security applications. Offline scanning may include configuring the set of security applications to be aware of each of the virtual machines' virtual resources as they reside as virtual objects on the computer system (physical machine). In this way, the set of security applications can examine (scan) those virtual resources from outside the virtual machine (e.g., using a knowledge of the internal format of the virtual machine data structures).

Although the terms "security application" and "supervisory process" are used herein, such concepts are not limited to applications or processes. Rather, any utility or facility that is configured to provide services to a virtual machine and/or its resources could be implemented on the host system to achieve the desired results without departing from the scope of the invention. Some examples of such a utility or facility include an anti-adware utility, an anti-spyware utility, a disk defragmenter, etc.

The offline scanning of virtual machine resources may take place while the virtual machines are running or dormant (e.g., in a paused or saved state). For example, in the situation where a virtual machine may be created by locating and loading an existing virtual machine image onto the host system 102, the offline scanning (and any needed cleaning or repairs) could occur before the virtual machine instance is "imported." Virtual machine resources that can be scanned in a paused or saved state include virtual hard disks, virtual machine memory contents, virtual communications port buffer structures, etc. In some implementations, it may not be possible to access the memory of a paused virtual machine. However, the virtual machine memory may still be accessible while the virtual machine is in a saved state or via a snapshot of a virtual machine.

Figure 2:
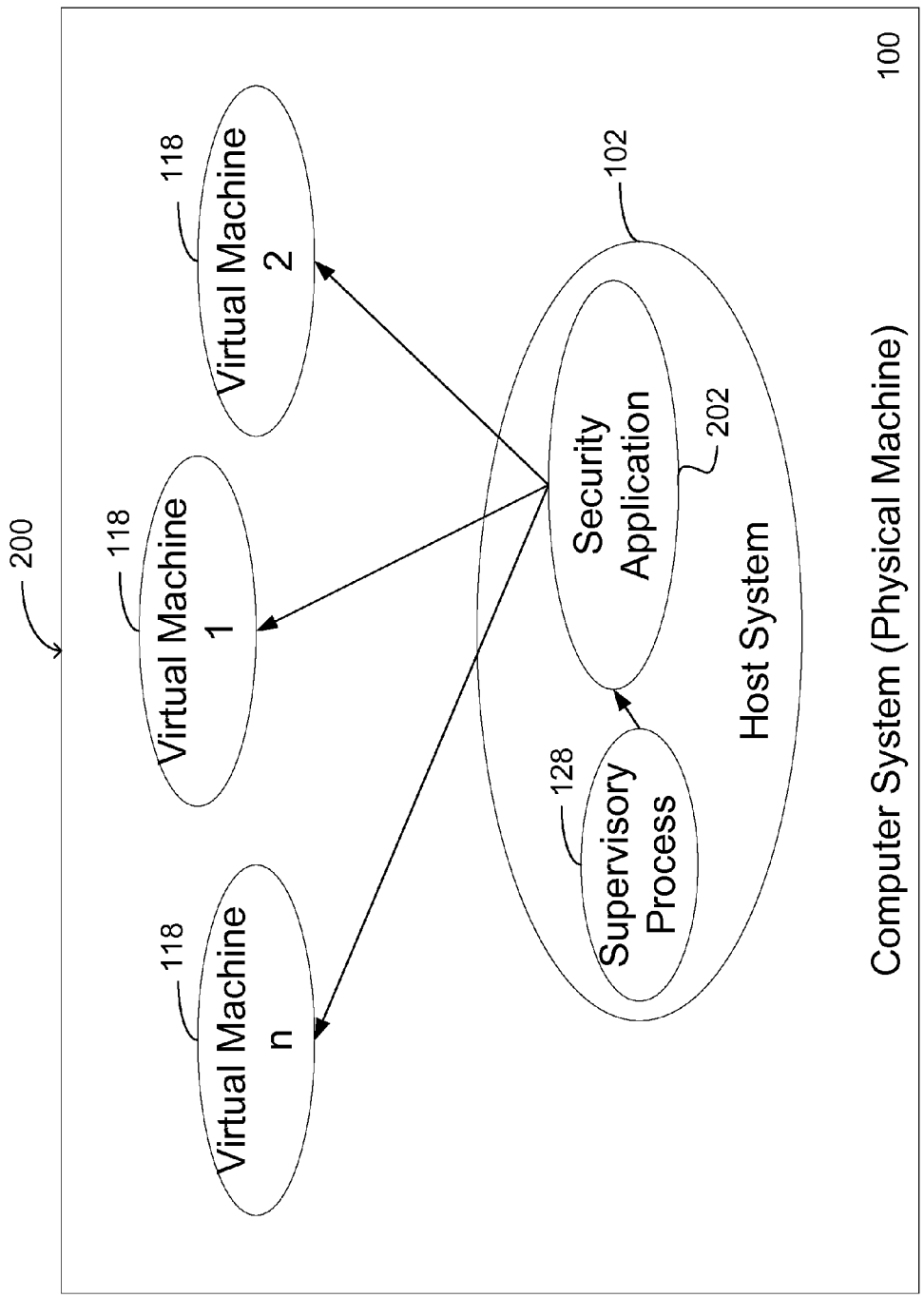
FIG. 2 is a block diagram showing an example of offline scanning of virtual machines in the system of FIG. 1.

Referring to FIG. 2, one example of an offline scanning configuration 200 is shown, illustrating various components of FIG. 1. In this configuration, a security application 202 and an optional supervisory process 128 reside on the host system 102. The security application 202, which may be at least partially controlled by the supervisory process 128, views the virtual machine 118's resources as a data structure or set of data structures that can be scanned for signs of security breaches. To allow it to access the virtual machine 118's resources in raw form and accurately detect security breaches, the security application 202 may rely on information about the semantics and configuration of data structures associated with the resources. In some embodiments, this information is updated to reflect any intentional changes in the semantics and configuration of the data structures.

For example, the security application 202 of FIG. 2 may be an antivirus scanning engine that scans the virtual machine 118 to determine if it is infected with one or more known viruses or worms. To begin the scanning process, the antivirus engine 202 loads a current signature definition file into its program memory. For example, the signature definition file may define the semantics and configuration of the virtual machine's virtual hard disk structure, thus providing a reference point for the antivirus engine as it scans the virtual machine's hard disk in its current state.

Next, the antivirus engine directs its scanning to read a portion of the physical machine's hard disk that correlates to the virtual machine's virtual hard disk. In this way, the antivirus engine effectively reads the contents of the virtual hard disk, and compares its content (e.g., a content object) with its list of known malicious content, using methods and techniques employed by those who are skilled in the art of detecting malicious software. For the purposes of this example, a content object within the virtual hard disk could be a file, or another object manipulated by the operating system such as a key from the Microsoft Windows System Registry, or any other object on disk that could be identified as part of an instance of malicious or undesirable software. Upon discovery of malicious software, the antivirus engine may attempt to remove any offending objects, or remove an infection that is located within an object.

Figure 3A:
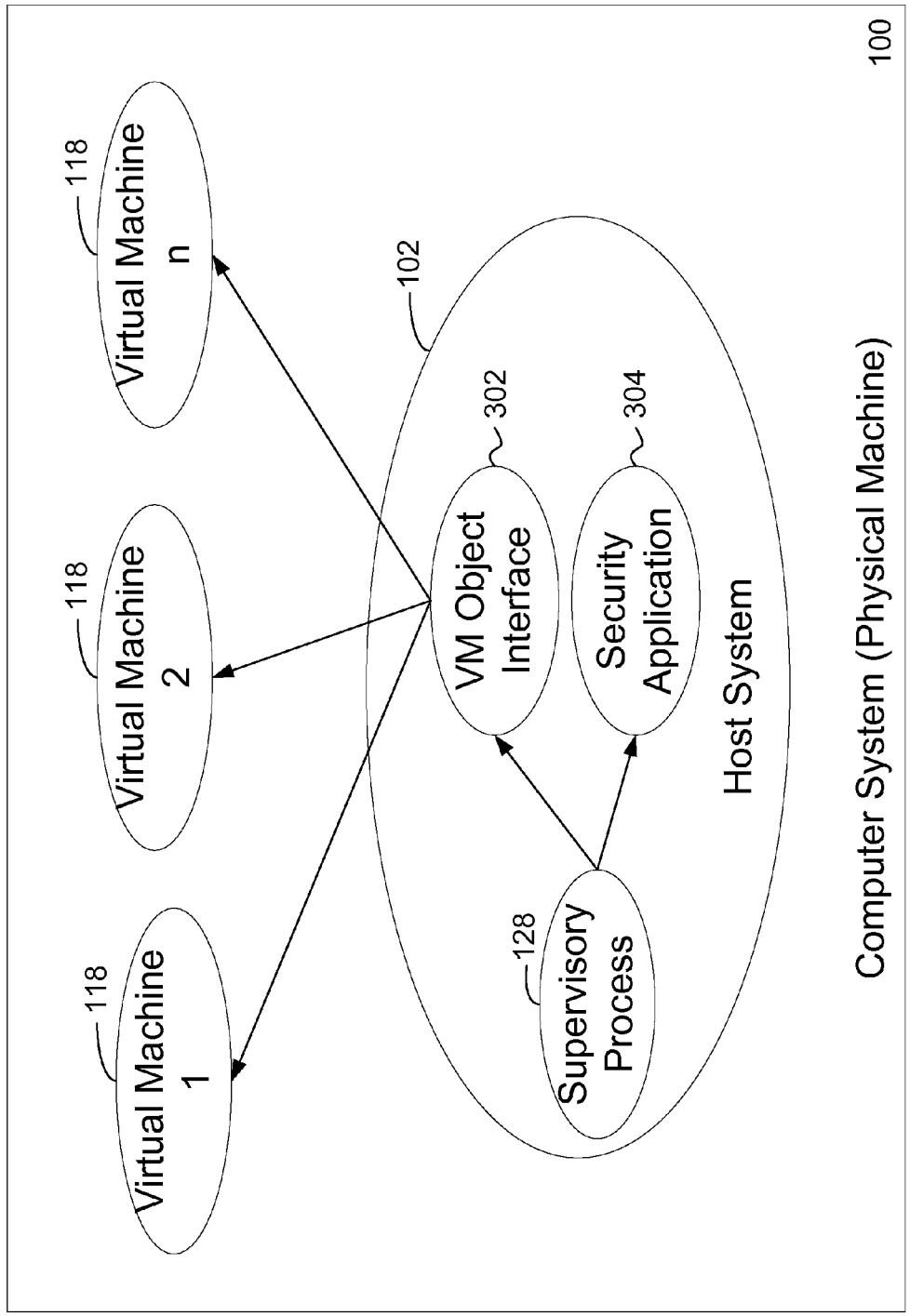
FIG. 3A is a block diagram showing an alternative example of offline scanning of the virtual machines in the system of FIG. 1.

FIG. 3A provides a second example of an offline scanning configuration 300. In this configuration, a virtual machine object interface 302 that is supported by the supervisory process 128 provides a uniform interface through which a security application 304 can access resources of the virtual machines. The virtual machine object interface 302 may map virtual machine data structures that may vary from virtual machine to virtual machine to a common format that can be accessed by the security application 304 for scanning and other activities. Thus, the security application 304 need only be developed to access this common format and not every format variation that a virtual machine may have. For example, the host system 102 may discover information about the state of the virtual machines 118 (such as disk state, memory state or communication state) so that a security application 304 can monitor them, looking for security breaches or other problems. In addition, the virtual machine object interface 302 may provide functionality that can be used by multiple security applications. For example, the virtual machine object interface 302 may provide a function that allows another security process to scan the virtual machine's virtual network adaptors for incoming network packets which have malicious content, such as worm payloads.

This configuration provides a designer of the virtual machine and a designer of the security application with some flexibility. For example, the designer of the virtual machine can alter data structures of the virtual machine without consequence to the designer of the security application. Thus, the security application 304 need only be developed to access this common format and not every format variation that a virtual machine may have.

In some embodiments, the offline scanning technique facilitates the synchronization of the virtual machine's current state with what the security application perceives as the virtual machine's current state, thus providing more accurate and consistent scanning capabilities. This synchronization may be useful in the case where the virtual machine's states are changing rapidly.

Figure 3B:
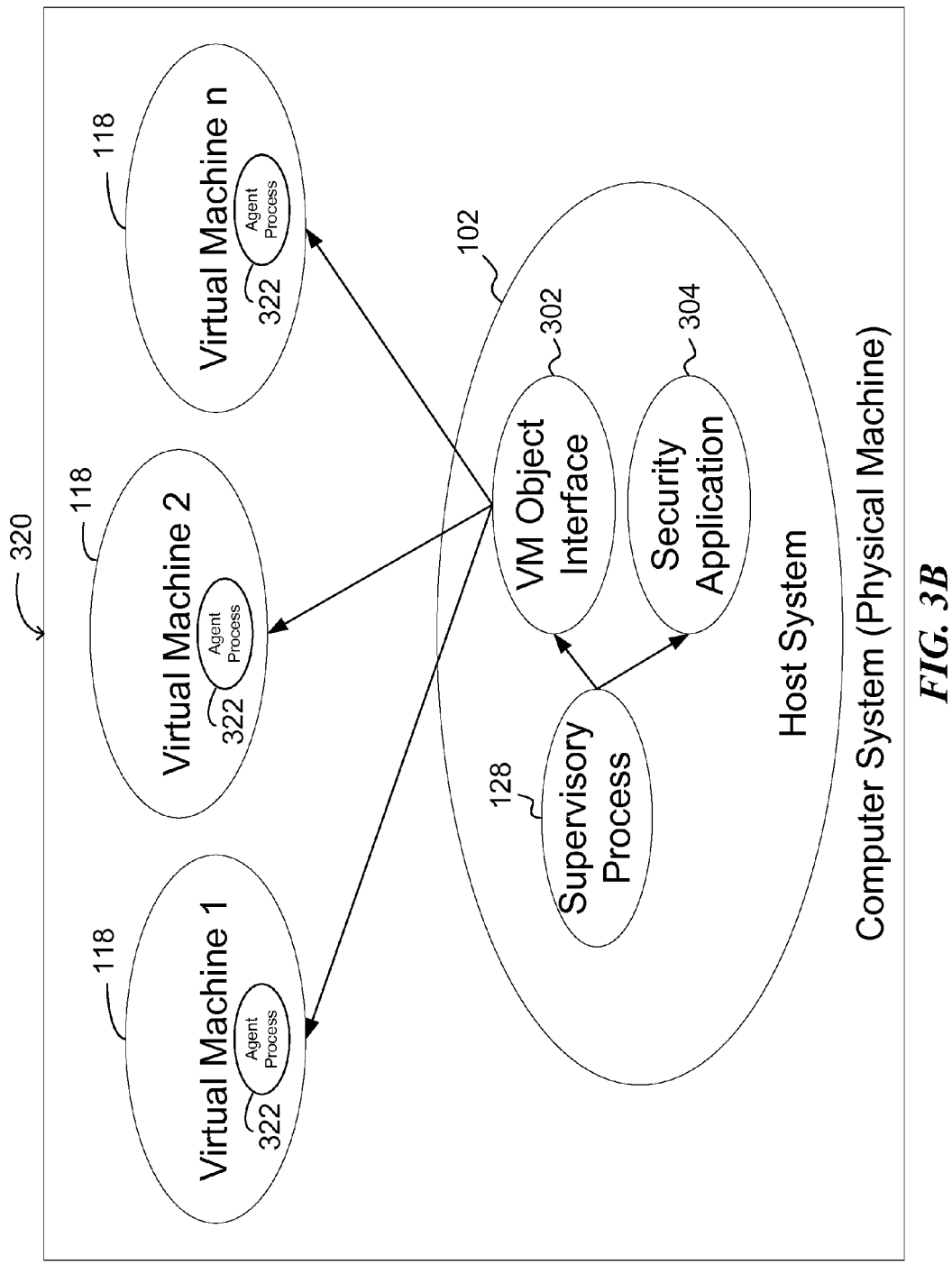
FIG. 3B is a block diagram showing another example of scanning of the virtual machines in the system of FIG. 1.

Referring to FIG. 3B, one way that this synchronization can be achieved is by running an agent process 322 that provides a near-real time self-consistent view of the virtual machine. The agent process 322, which may run on the virtual machine 118, can then export this view of the virtual machine to the virtual machine object interface 302, which can then provide appropriate information to the supervisory process and/or security application. In some embodiments, the agent process 322 may provide an application programming interface (API) for use by the virtual machine object interface 302. (Alternatively, the security application may provide a similar API for use by the virtual machine object interface 302.)

An alternative way that this synchronization can be achieved is to have the virtual machine 118 create constant snapshots of its state and store these snapshots in memory or on disk. While such snapshots may be a few seconds "stale," they will nonetheless be self-consistent.

Figure 3C:
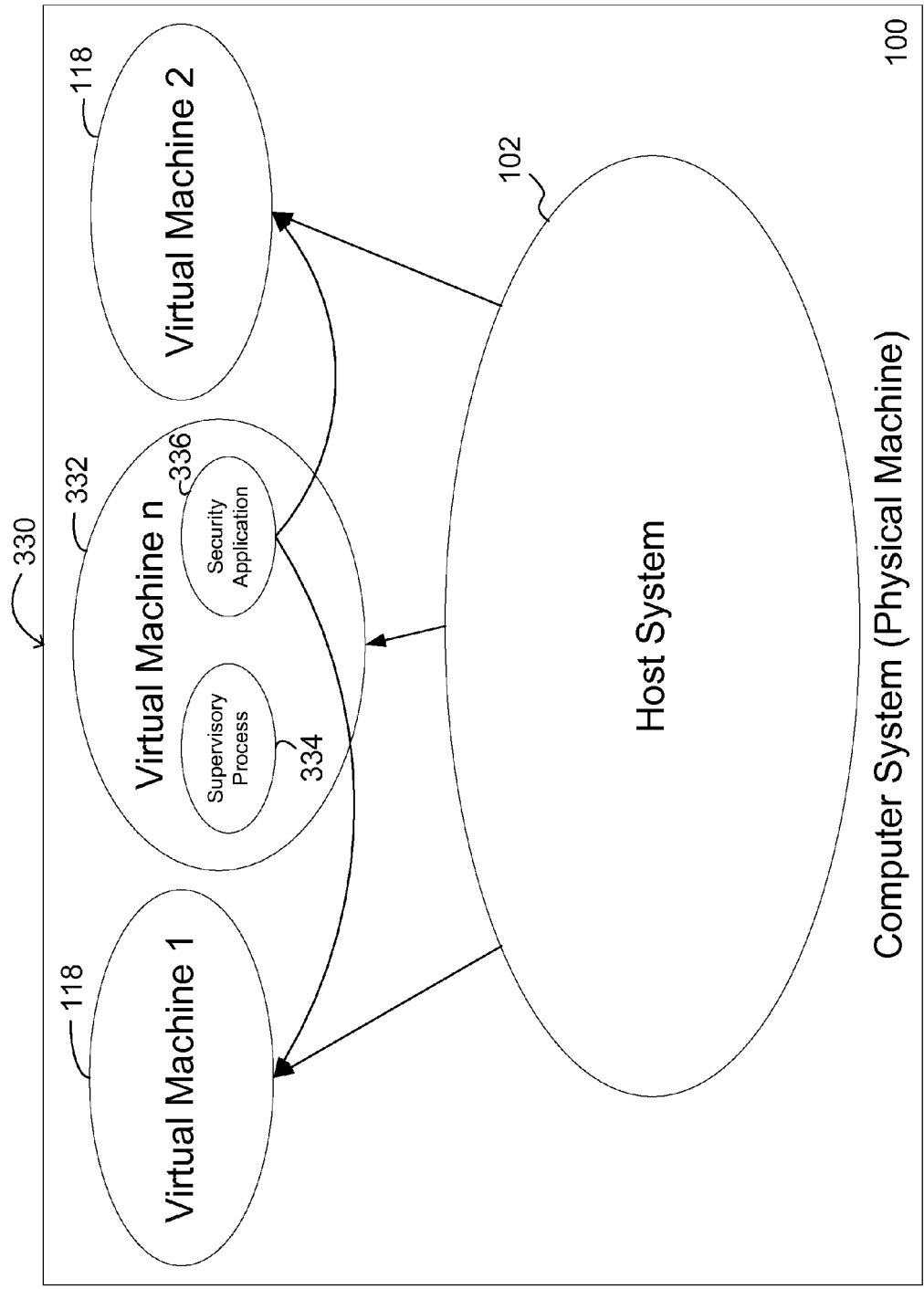
FIG. 3C is a block diagram showing yet another example of scanning of the virtual machines in the system of FIG. 1.

Referring to FIG. 3C, an alternative technique for providing security scanning of the virtual machines is a system 330 configured so that a security application 336 and supervisory process 334 are running on a designated virtual machine 332 (instead of directly on the host system 102). The security application 336 and supervisory process 334 can then monitor and/or scan the other virtual machines 118 to detect problems. In this way, the designated virtual machine 332 (which may be dedicated to providing security monitoring) can remain protected from attack.

III. System Flows

FIGS. 4 through 8 are representative flow diagrams that show processes that occur within the system of FIG. 1. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented.

Figure 4:
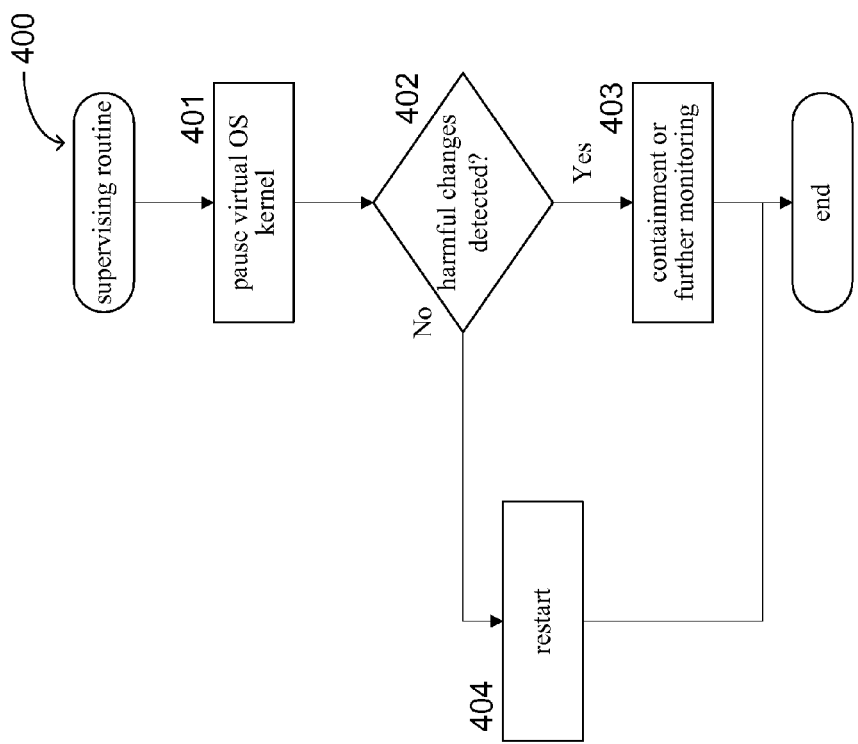
FIG. 4 is a flow diagram showing a routine performed by a supervisory process that monitors an operating system in the system of FIG. 1.

Referring to FIG. 4, a supervisory routine 400 performed, for example, by the supervisory process of FIG. 1, may run on (or off) the host system to monitor, modify, and/or configure processes or virtual operating systems running on the virtual machine. Alternatively, the supervisory routine 400 may monitor, modify, and/or configure processes running on a hardened (but not virtual) operating system.

At block 401, the routine 400 pauses the virtual machine operating system. At decision block 402, the routine 400 checks for changes that may result from damaging activities (e.g., rogue processes) occurring within the virtual machine. For example, the routine 400 may scan a portion of the virtual machine operating system kernel to check for problems. As an alternative to (or in addition to) monitoring the virtual operating system kernel, the routine 400 may monitor other aspects connected with the virtual (or hardened) operating system. For example, the routine 400 may monitor virtual address spaces, monitor emulated devices, monitor an emulated hard drive, perform integrity verifications (e.g., perform checksums), check the integrity of files that reside on the virtual disk or in memory, etc.

If, at decision block 402, the routine 400 does not detect changes that may result from damaging activities, the routine 400 proceeds to block 404 to restart the virtual operating system kernel before ending. However, in some embodiments (not illustrated), the routine 400 may loop back to block 401 (after a time period elapses) to perform the pause and check steps again (unless the virtual operating system instance is terminated). If, however, at decision block 402, the routine 400 detects changes that may result from damaging activities, the routine proceeds to block 403, where the routine initiates containment actions. Example containment actions may include activities such as suspending the guest operating system to do additional scanning, suspending select processes, cleaning the malware and reformatting the virtual operating system to repair any damage, shutting down the virtual machine after taking a "snapshot" so that the virtual machine environment can be more or less restored once the virtual machine is restarted, etc.

Figure 5:
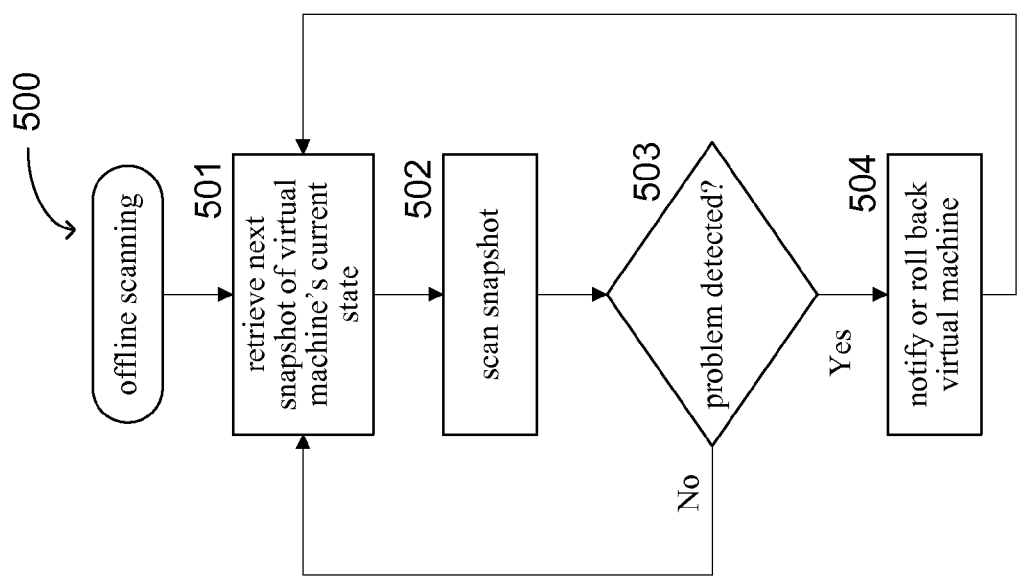
FIG. 5 is a flow diagram showing an example of a security monitoring routine that monitors the virtual machines in the system of FIG. 1 using periodic scanning.

FIG. 5 provides an example of an offline scanning routine 500 facilitated by a supervisory process that controls a set of security applications (e.g., antivirus software) configured to perform offline scanning and repair of a virtual machine running on the host system. At block 501 the routine 500 retrieves a period snapshot of the running virtual machine's current state. At block 502, the routine scans the retrieved periodic snapshot. At decision block 503, if a problem is detected, the routine proceeds to block 504, where the routine notifies the running virtual machine of the problem or, alternatively, instructs the virtual machine to roll back to a last saved state before the problem occurred. If at decision block 503, the routine 500 does not detect a problem, the routine loops back to block 501 to retrieve the next periodic snapshot.

Figure 6:
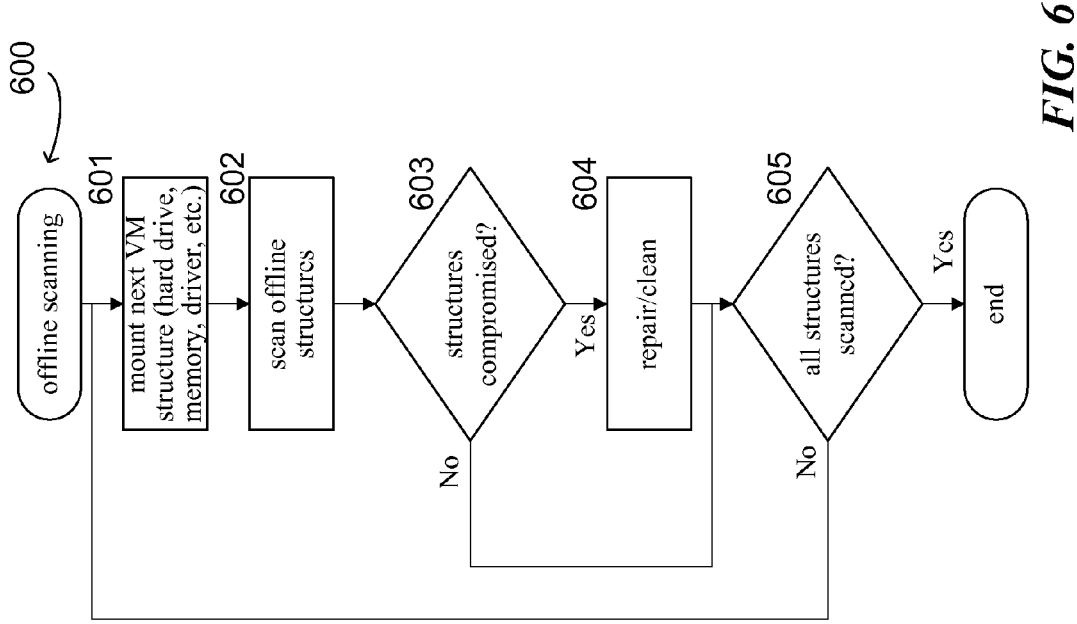
FIG. 6 is a flow diagram showing a second example of a security monitoring routine that monitors the virtual machines in the system of FIG. 1 using virtual machine structure mounting.

FIG. 6 provides an example of an offline scanning routine 600 facilitated by a supervisory process that controls a set of security applications (e.g., antivirus software) configured to perform offline scanning and repair of multiple virtual machines running on the host system. For example, the routine 600 may be used to detect and recover a virtual machine that has been disabled due to a malware infection. At block 601, the routine 600 mounts the virtual machine's next structure or component onto the host system in a way that may be analogous to mounting a physical disk. In this way, the structure or component is incorporated as part of computer's operating system instead of being treated as an outside scanned object. The structure or component may be an emulated component as viewed from the perspective of the host system. In some embodiments, the virtual machine's structures or components can be objectified such that the host system may provide an interface for the set of security applications to scan them. For example, the virtual machine's memory may be objectified to scan for in-memory malware.

At block 602, the set of security applications scans the virtual hard drive structure (or in-memory structure, etc.). At decision block 603, if the scanned structure is compromised, then the routine 600 continues at block 604, where the security applications repair the virtual hard drive structure (or in-memory structure). If, however, at decision block 603, the scan component is not compromised, the routine proceeds to decision block 605.

At decision block 605, if all the structures or components of the virtual machine have been scanned, the routine ends. Otherwise, the routine loops back to block 601 to mount the next virtual machine structure or component.

In some embodiments, the routine 600 may be used in combination with optimization techniques that track changes occurring between scans in each of the virtual machine hard drives. In this way, the routine 600 may scan only changes since the last scan, thereby improving efficiency in scanning. For example, an optimization routine could track changes in the virtual machine's hard drive on a block level. Changes at the block level may then be mapped to changes at a file level for scanning purposes (as typical antivirus software scans at the file level). Alternatively, changes could be tracked by looking at modifications to master file table structures. This may involve checkpoint storage of prior master file tables in the host system.

Figure 7:
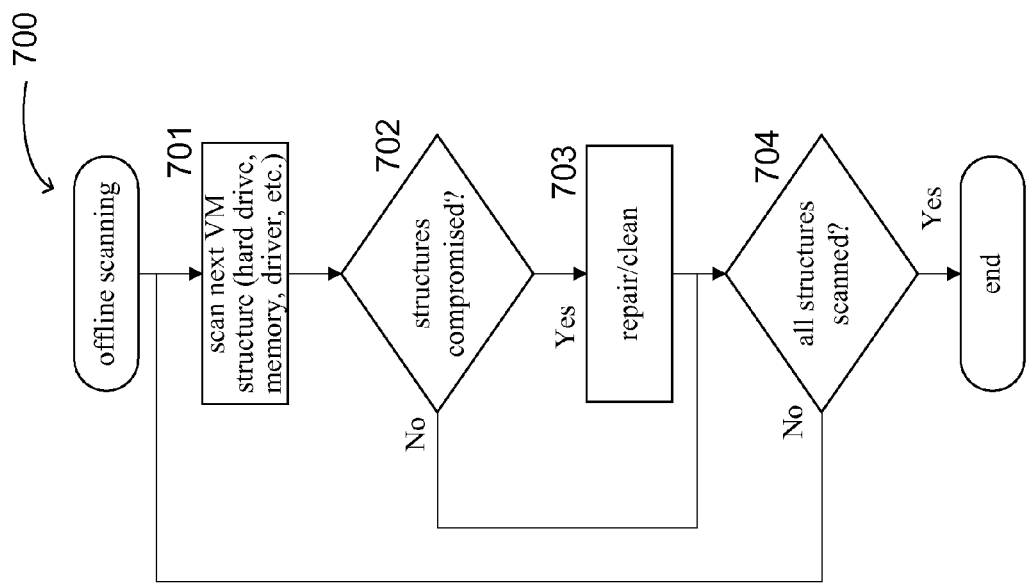
FIG. 7 is a flow diagram showing a third example of a security monitoring routine that monitors the virtual machines in the system of FIG. 1 without using virtual machine structure mounting.

FIG. 7 provides an example of an offline scanning routine 700 facilitated by a supervisory process that controls a set of security applications (e.g., antivirus software) configured to perform offline scanning and repair of multiple virtual machines running on the host system. For example, the routine 700 may be used to detect and recover a virtual machine that has been disabled due to a malware infection. As opposed to the offline scanning routine of FIG. 6, which mounts the virtual machine's structure or component prior to scanning, the routine of FIG. 7 scans the structure or component externally. At block 701, the routine 700 scans the virtual machine's next structure or component. The structure or component may be an emulated component as viewed from the perspective of the host system. In some embodiments, the virtual machine's structures or components can be objectified such that the host system may provide an interface for the set of security applications to scan them. For example, the virtual machine's memory may be objectified to scan for in-memory malware.

At decision block 702, if the scanned structure is compromised, then the routine 700 continues at block 703, where the security applications repair the virtual hard drive structure (or in-memory structure). If, however, at decision block 702, the scanned component is not compromised, the routine proceeds to decision block 704. At decision block 704, if all the structures or components of the virtual machine have been scanned, the routine ends. Otherwise, the routine loops back to block 701 to mount the next virtual machine structure or component.

Figure 8:
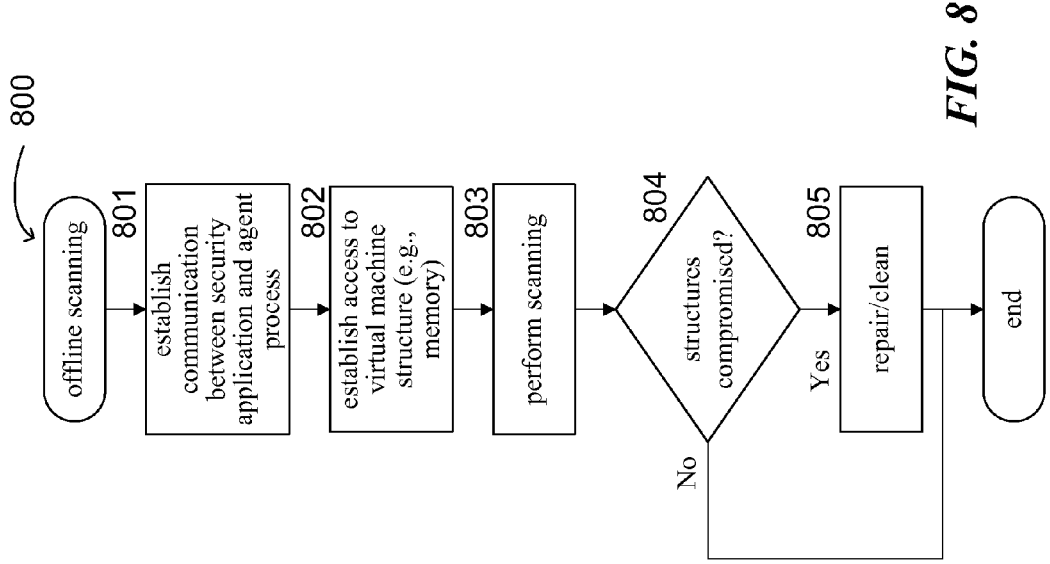
FIG. 8 is a flow diagram showing a second example of a security monitoring routine that monitors the virtual machines in the system of FIG. 1 using an agent process running in the virtual machine.

FIG. 8 is a flow diagram that provides a second example of an offline scanning routine 800 facilitated by a supervisory process that controls a set of security applications (e.g., antivirus software) configured to perform offline scanning and repair of multiple virtual machines running on the host system. In the routine 800, an agent process, such as the agent process 322 of FIG. 3B, enables synchronization of the actual state of the virtual machine as it is being scanned, and the state of the virtual machine as perceived by the security applications.

At block 801 the routine 800 establishes communication between the security application (such as the security application 304 of FIG. 3B, which runs on the host system or on a virtual machine object interface) and the agent process via some inter-machine communications interface. At block 802 the routine 800 establishes access to the virtual machine's memory. For example, the agent process running on the host system may provide access to a virtual buffer that corresponds to the virtual machine's application memory. The routine continues at block 803, where the security application scans the memory for evidence of a security problem. For example, when the security application is an antivirus scanning engine, the antivirus scanning engine may scan the memory looking for code patterns that match signatures of known malicious software. At decision block 804, if any structures or components of the virtual machine have been compromised, the routine 800 continues at block 805, where the security application and/or the agent process cleans the computer memory. Alternatively, the security application could signal the agent process to take corrective action directed to the virtual machine. If, however, at decision block 804, no structures or components have been compromised, then the routine ends.

IV. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively, where the context permits.

The teachings of the invention provided herein can be applied to other systems, not necessarily the system described herein. The elements and acts of the various embodiments described above can be combined to provide further embodiments.

This application is related to commonly owned U.S. patent application Ser. No. 11/018412, entitled "Method and System for a Self-healing Device" filed Dec. 21, 2004. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. As noted above, particular terminology used when describing certain features or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. In a computer, a method for monitoring and protecting multiple instances of a contained process execution environment, wherein each of the multiple instances accesses emulated resources of the computer, the method comprising:

executing, on the computer, at least one security application that monitors each of the multiple instances of a contained process execution environment to detect harmful processes, wherein the at least one security application executes external to the multiple instances of a contained process execution environment;

facilitating scanning of virtual resources of the each of the multiple instances of a contained process execution environment by the single set of security applications, wherein the virtual resources include the emulated resources of the computer, and wherein the facilitating includes configuring the set of security applications to be aware of the resources as perceived by a primary operating system of the computer; and wherein facilitating the scanning of virtual resources of each of the multiple instances of a contained process execution environment by the single set of security applications includes providing access to a virtual network adaptor structure associated with one of the multiple instances of a contained process execution environment.

2. The method of claim 1 wherein the at least one security application accesses each of the multiple instances of a contained process execution environment via communication with corresponding agent security processes that run in each of the multiple instances of a contained process execution environment in a one-to-one correspondence.

3. The method of claim 1 wherein the at least one security application accesses each of the multiple instances of a contained process execution environment via a virtual machine object interface that provides a uniform interface through which the at least one security application 304 can access the emulated resources.

4. The method of claim 1 wherein the at least one security application executes in a host system provided by the computer, and wherein each of the multiple instances of a contained processes execution environment also executes in the host system.

5. The method of claim 1 wherein the at least one security application executes in a host system provided by the computer, wherein each of the multiple instances of a contained processes execution environment also executes in the host system, and wherein the at least one security application is controlled, at least in part, by a supervisory process executing in the host system.

6. The method of claim 1 wherein facilitating the scanning of virtual resources of each of the multiple instances of a contained process execution environment by the single set of security applications includes providing access to a virtual memory structure associated with one of the multiple instances of a contained process execution environment.

7. The method of claim 1 wherein facilitating the scanning of virtual resources of the each of the multiple instances of a contained process execution environment by the single set of security applications includes providing access to a virtual hard disk structure associated with one of the multiple instances of a contained process execution environment.

8. In a computer, a method for monitoring and protecting multiple instances of a contained process execution environment, wherein each of the multiple instances accesses emulated resources of the computer, the method comprising:
    executing, on the computer, at least one security application that monitors each of the multiple instances of a contained process execution environment to detect harmful processes, wherein the at least one security application executes external to the multiple instances of a contained process execution environment;
    facilitating scanning of virtual resources of the each of the multiple instances of a contained process execution environment by the single set of security applications, wherein the virtual resources include the emulated resources of the computer, and wherein the facilitating includes configuring the set of security applications to be aware of the resources as perceived by a primary operating system of the computer; and
    wherein facilitating the scanning of virtual resources of the each of the multiple instances of a contained process execution environment by the single set of security applications includes providing access to a virtual driver structure associated with one of the multiple instances of a contained process execution environment.

9. In a computer, a method for monitoring and protecting multiple instances of a contained process execution environment, wherein each of the multiple instances accesses emulated resources of the computer, the method comprising:
    executing, on the computer, at least one security application that monitors each of the multiple instances of a contained process execution environment to detect harmful processes, wherein the at least one security application executes external to the multiple instances of a contained process execution environment;
    facilitating scanning of virtual resources of the each of the multiple instances of a contained process execution environment by the single set of security applications, wherein the virtual resources include the emulated resources of the computer, and whererin the facilitating includes configuring the set of security applications to be aware of the resources as perceived by a primary operating system of the computer; and
    where a harmful process is detected in one of the multiple instances of a contained process execution environment, deactivating the instance if it is not already deactivated; and repairing the instance; and loading the repaired instance into a host environment of the computer so that it becomes active.

10. A method in a computer system for protecting an operating system against damage caused by undesirable process actions, the method comprising:
    pausing a kernel running on the operating system, wherein the operating system is at least partially isolated from core aspects of the computer system's infrastructure;
    checking the kernel to determine whether there is evidence of an undesirable process action, wherein the checking is performed, at least in part, by a supervisory process that is separate from the at least partially isolated operating system; and
    where there is evidence of an undesirable process action in the at least partially isolated operating system, taking steps to contain the undesirable process action.

11. The method of claim 10 wherein the steps to contain the undesirable process action include suspending the at least partially isolated operating system and performing further monitoring.

12. The method of claim 10 wherein the steps to contain the undesirable process action include suspending select processes running on the at least partially isolated operating system.

13. The method of claim 10 wherein the steps to contain the undesirable process action include terminating a process associated with the undesirable process action.

14. A computer system for securing access to privileged operations associated with core components of the computer system, the system comprising:
    a processor;
    a primary memory storage in communication with the processor;
    a secondary storage device;
    an operating system; and
    a host system, wherein the host system includes:
        one or more virtual machines, wherein each of the one or more virtual machines is isolated from the core components of the computer system such that harmful processes cannot directly access the core components when running in an environment associated with the virtual machine, and wherein each one of the one or more virtual machines includes an instance of a virtual operating system, access to a virtual memory, and at least one virtual driver; and
        at least one supervisory process used to monitor the one or more virtual machines in combination with a security application, wherein the monitoring includes the possible detection of a harmful process, and wherein the at least one supervisory process and the security application are isolated from the virtual machine.

15. The system of claim 14 wherein the monitoring further includes monitoring address spaces of the virtual memory.

16. The system of claim 14 wherein the virtual machine further includes access to one or more emulated devices, and wherein the monitoring further includes monitoring the emulated devices.

17. The system of claim 14 wherein the virtual machine further includes access to an emulated hard drive, and wherein the monitoring further includes monitoring the emulated hard drive.

18. The system of claim 14 wherein the monitoring further includes performing integrity verifications on input to, or output from, processes running on the virtual machine.

19. The system of claim 14 wherein the virtual machine further includes access to an emulated hard drive, and wherein the monitoring further includes checking the integrity of files that reside on the virtual memory or the emulated hard drive.

* * * * *

UNITED STATES PATENT AND TRADEMARK OFFICE
CERTIFICATE OF CORRECTION

| | | |
|---|---|---|
| PATENT NO. | : 7,409,719 B2 | Page 1 of 1 |
| APPLICATION NO. | : 11/019094 | |
| DATED | : August 5, 2008 | |
| INVENTOR(S) | : Benjamin Armstrong et al. | |

It is certified that error appears in the above-identified patent and that said Letters Patent is hereby corrected as shown below:

In column 14, line 7, in Claim 9, delete "whererin" and insert -- wherein --, therefor.

Signed and Sealed this
Twenty-sixth Day of April, 2011

David J. Kappos
*Director of the United States Patent and Trademark Office*